United States Patent
Majeti et al.

(10) Patent No.: US 10,009,305 B2
(45) Date of Patent: Jun. 26, 2018

(54) UBIQUITOUS USER CONTROL FOR INFORMATION COMMUNICATED AMONG END USER COMMUNICATION DEVICES

(75) Inventors: Venkata C. Majeti, Naperville, IL (US); Saiprasad Pennabadi, Naperville, IL (US)

(73) Assignee: Loment, Inc., Naperville, IL (US)

( * ) Notice: Subject to any disclaimer, the term of this patent is extended or adjusted under 35 U.S.C. 154(b) by 0 days. days.

(21) Appl. No.: 13/065,839

(22) Filed: Mar. 31, 2011

(65) Prior Publication Data

US 2012/0250593 A1    Oct. 4, 2012

(51) Int. Cl.
*H04B 7/00* (2006.01)
*H04L 12/58* (2006.01)

(52) U.S. Cl.
CPC ........... *H04L 51/18* (2013.01); *H04L 51/38* (2013.01)

(58) Field of Classification Search
CPC ....... G06Q 10/107; H04L 51/18; H04L 51/22; H04L 51/26; H04L 63/123; G06F 21/10
USPC .......................... 709/206, 215, 207
See application file for complete search history.

(56) References Cited

U.S. PATENT DOCUMENTS

| | | | |
|---|---|---|---|
| 6,078,820 A * | 6/2000 | Wells et al. | 455/466 |
| 6,125,281 A * | 9/2000 | Wells et al. | 455/466 |
| 6,370,389 B1 * | 4/2002 | Isomursu et al. | 455/466 |
| 7,164,928 B2 | 1/2007 | Ding et al. | |
| 7,596,599 B1 | 9/2009 | Maghsoodnia et al. | |
| 7,684,811 B2 | 3/2010 | Beckmann et al. | |
| 2002/0044655 A1 * | 4/2002 | Applebaum | 380/45 |
| 2002/0112015 A1 * | 8/2002 | Haynes | 709/206 |
| 2003/0040300 A1 * | 2/2003 | Bodic | H04L 12/5835 455/412.1 |
| 2003/0065738 A1 * | 4/2003 | Yang et al. | 709/215 |
| 2003/0236981 A1 * | 12/2003 | Marmigere et al. | 713/168 |
| 2007/0293202 A1 | 12/2007 | Moshir et al. | |
| 2008/0081601 A1 | 4/2008 | Moshir et al. | |

(Continued)

FOREIGN PATENT DOCUMENTS

| | | |
|---|---|---|
| WO | 0049786 | 8/2000 |
| WO | 2008134622 | 11/2008 |

OTHER PUBLICATIONS

ETSI 3GPP, "Technical Realization of the Short Message Service (SMS) Point to Point (PP) (3GPP TS 03.40 version 7.5.0 Release 1998)", GSM, version 7.5.0, Release 1998.*

*Primary Examiner* — Shean Tokuta
(74) *Attorney, Agent, or Firm* — Patti & Malvone Law Group, LLC

(57) ABSTRACT

An exemplary method processes an electronic communication received by a first end-user communication device, where the electronic communication comprises a digital packet having a header segment and a user data segment. A determination is made whether the received user data segment contains a first label that identifies a corresponding enhanced services application program stored in memory of the first end-user communication device. On identifying a first label, a determination is made whether the received user data segment contains a first command that identifies a corresponding action to be taken by the first enhanced services application program. On determining the existence of a first command, the first enhanced services application program causes a first action corresponding to the first command to be executed on the first end-user communication device.

18 Claims, 7 Drawing Sheets

(56) References Cited

U.S. PATENT DOCUMENTS

| | | | |
|---|---|---|---|
| 2008/0108324 A1 | 5/2008 | Moshir et al. | |
| 2008/0109370 A1 | 5/2008 | Moshir et al. | |
| 2008/0133930 A1 | 6/2008 | Moshir et al. | |
| 2008/0167060 A1 | 7/2008 | Moshir et al. | |
| 2008/0188963 A1* | 8/2008 | McCoy | 700/90 |
| 2008/0214111 A1 | 9/2008 | Moshir et al. | |
| 2009/0191902 A1 | 7/2009 | Osborne | |
| 2009/0191903 A1* | 7/2009 | Fiatal | G06Q 10/107 455/466 |
| 2009/0212972 A1* | 8/2009 | Kellum | 340/902 |
| 2009/0265552 A1 | 10/2009 | Moshir et al. | |
| 2010/0020972 A1 | 1/2010 | Baugher et al. | |
| 2010/0024010 A1 | 1/2010 | Baugher et al. | |
| 2010/0024020 A1 | 1/2010 | Baugher et al. | |
| 2010/0024028 A1 | 1/2010 | Baugher et al. | |
| 2010/0042690 A1* | 2/2010 | Wall | 709/206 |
| 2010/0162387 A1 | 6/2010 | Baugher et al. | |
| 2010/0162388 A1* | 6/2010 | Baugher et al. | 726/19 |
| 2010/0275007 A1* | 10/2010 | Kutt et al. | 713/150 |

* cited by examiner

|     | 0 | 1 | 2 | 3 | 4 | 5 | 6 | 7 | 8 | 9 | 10 | 11 | 12 | 13 | 14 | 15 | 16 | 17 | 18 |
|-----|---|---|---|---|---|---|---|---|---|---|----|----|----|----|----|----|----|----|----|
| Ex1 | / | / | P | : | 1 | 0 | D | E | A | C | T  | I  | V  | A  | T  | E  |    |    |    |
| Ex2 | / | / | P | : | 1 | 0 | W | I | P | E | O  | U  | T  |    |    |    |    |    |    |
| Ex3 | / | / | P | : | 0 | 0 | H | E | L | L | O  |    | F  | M  |    | M  | I  | K  | E  |
| Ex4 | / | / | P | : | 0 | 4 | E | 0 | 0 | 6 | H  | E  | L  | L  | O  |    | F  | M  | .... |
| Ex5 | / | / | P | : | 0 | 7 | L | 0 | 0 | 0 | 1  | 2  | 1  | M  | E  | S  | 1  | .... |    |
| Ex6 | / | / | P | : | 0 | 7 | L | 0 | 0 | 0 | 1  | 2  | 2  | M  | E  | S  | 2  | .... |    |
| Ex7 | / | / | P | : | 0 | 12 | E | 0 | 0 | 5 | 255 | L | 0  | 0  | 0  | 2  | 2  | 1  |    |
| Ex8 | / | / | P | : | 0 | 7 | L | 0 | 0 | 0 | 2  | 2  | 2  | M  | E  | S  | 2  | .... |    |
| Ex9 |   |   |   |   |   |   |   |   |   |   |    |    |    |    |    |    |    |    |    |

FIG. 5

UBIQUITOUS USER CONTROL FOR INFORMATION COMMUNICATED AMONG END USER COMMUNICATION DEVICES

BACKGROUND

This invention relates to communications among end user communication devices and more specifically to ubiquitous control of user data transmitted to, received by and stored on end user communication devices, especially but not limited to wireless end user communication devices, which may be made by different manufacturers and/or have different operating systems.

Wireless communication devices are now prevalent throughout all developed countries of the world. Although cellular telephones are currently the most widespread, other types of wireless communication devices include personal digital assistants, laptop computers with Wi-Fi and/or telecommunication carrier communication support, and various types of "pads" that provide visual displays that are larger than conventional cellular telephones but typically smaller than the displays of a laptop computer. Wireless voice communications between mobile devices utilizing different types of communication protocols, e.g. analog, TDMA, CDMA, VOIP, etc., are supported by different telecommunication carriers which provide appropriate communication protocol interfaces/gateways to facilitate voice communications between mobile units using different communication protocols.

Other types of wireless communications may also be supported for wireless communication devices. For example, text messaging, short messaging service (SMS), multimedia messaging service (MMS), email such as by simple mail transfer protocol (SMTP), and instant messaging utilizing hypertext transfer protocol (HTTP) are available. Each type service is supported by a transport layer that is part of the telecommunication signaling structure associated with the transport of user communications and the communication of telecommunication infrastructure commands and signals. The transport layer provides command and control among telecommunication infrastructure nodes and with the users' mobile devices associated with the transfer of user data and/or system level commands. However, this transport layer is not designed to provide controllable parameters independently set by the user, i.e. the user is not provided the opportunity to directly control transport layer parameters in order to effectuate control of user data. Thus, users of wireless mobile devices have only a limited ability to exercise control over how user data is transferred, processed, delivered and stored by the origination and destination end user devices, and no ability to transmit commands from one mobile device to another mobile device where the commands effectuate changes to the recipient mobile device and/or user data stored in that device.

SUMMARY

It is an object of the present invention to satisfy this need.

An exemplary method processes an electronic communication received by a first end-user communication device, where the electronic communication comprises a digital packet having a header segment and a user data segment. A determination is made whether the received user data segment contains a first label that identifies a corresponding enhanced services application program stored in memory of the first end-user communication device. On identifying a first label, a determination is made whether the received user data segment contains a first command that identifies a corresponding action to be taken by the first enhanced services application program. On determining the existence of a first command, the first enhanced services application program causes a first action corresponding to the first command to be executed on the first end-user communication device.

The present invention includes the end-user communication device that executes this method.

The present invention also includes a computer program product, comprising a computer usable tangible medium having a computer readable program code embodied therein, where the computer readable program code is adapted to be executed to implement this method.

DESCRIPTION OF THE DRAWINGS

Features of exemplary implementations of the invention will become apparent from the description, the claims, and the accompanying drawings in which:

FIG. 5 is a table where each row represents a transmission of information in accordance with an embodiment of the present invention.

DETAILED DESCRIPTION

Figure 1:
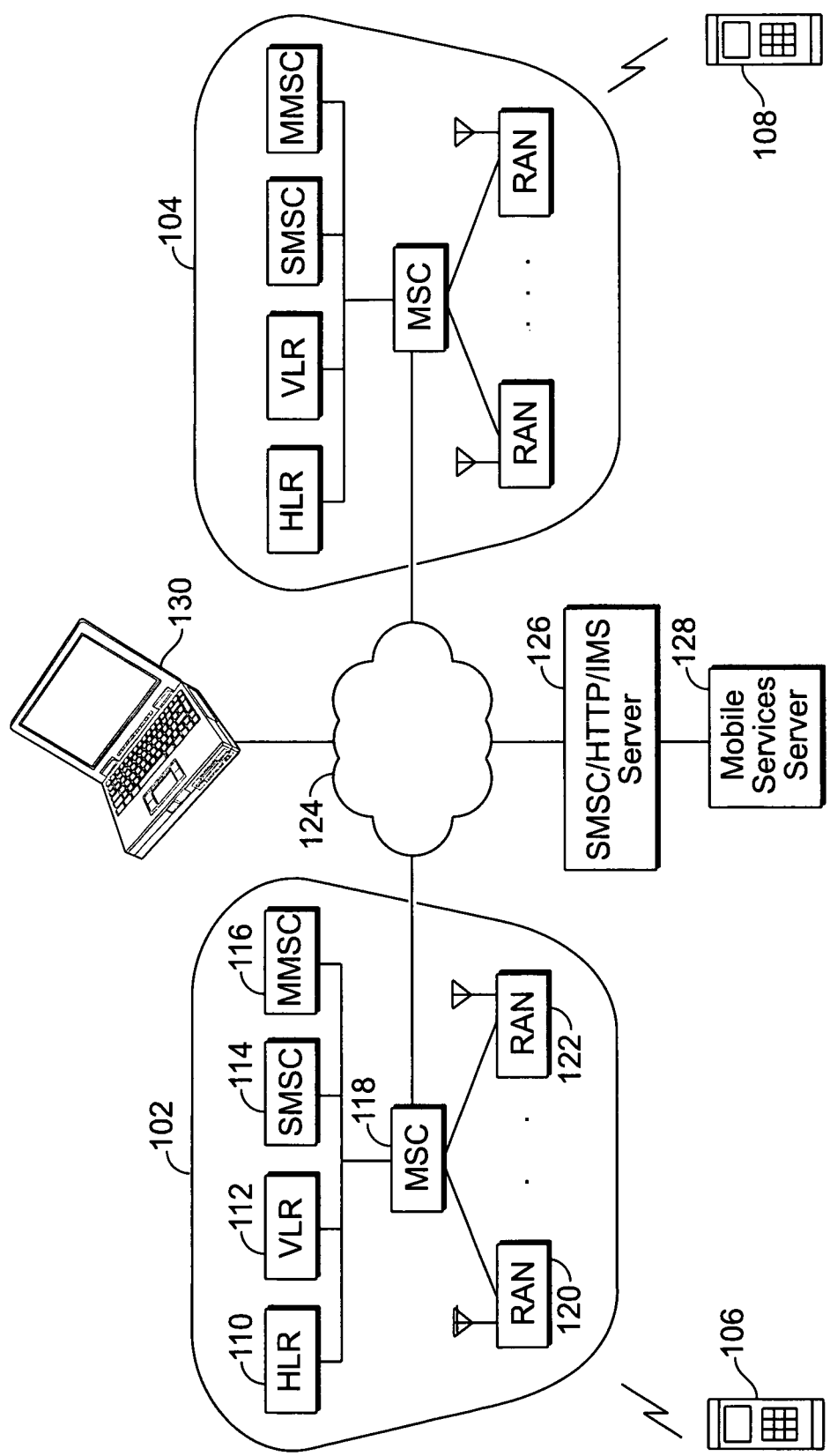
FIG. 1 is a block diagram of an illustrative communication system suited for supporting an embodiment of the present invention.

Referring to FIG. 1, wireless communication systems 102 and 104 support communications with a plurality of wireless mobile devices including exemplary wireless mobile devices (units) 106 and 108, respectively. The communication system 102 includes a home location register (HLR) 110 that serves as an operations and administration center for registered wireless mobile devices and includes information of the current location of the respective mobile devices. A visitor location register (VLR) 112 provides temporary registration and location services for wireless mobile devices located in a communication system that is not the home system for the mobile device. A short messaging service center (SMSC) 114 functions as a server for the transmission and reception of SMS messages for wireless mobile devices supported by communication system 102. A multimedia service center (MMSC) 116 provides a similar function to SMSC 114 for the transmission and reception of multimedia information for wireless mobile devices supported by communication system 102. These nodes/elements perform their known functions as part of the infrastructure that supports wireless mobile communications. A mobile switching center (MSC) 118 provides switching for voice and data communications associated with the supported wireless mobile devices. A plurality of radio access nodes (RANs) 120 and 122 provide a wireless communications link between the system 102 and the supported wireless mobile units. Each RAN is connected to the MSC 118 wherein wireless messages received from a mobile unit by a RAN are transferred to MSC 118 for further routing, and messages to be delivered to a mobile unit are transferred from the MSC 118 to a RAN where such messages are then wirelessly transmitted by the RAN to the destination mobile unit. The elements of communication system 104 are the same as elements in communication system 102 and provide the same functionality for the respective supported mobile units. Hence, the elements of communication system 104 need not be described in detail.

A communication network 124 provides a communication link between the MSCs of systems 102 and 104. Communications with an exemplary SMSC/HTTP/IMS server 126 is also supported by network 124, where HTTP means hypertext transfer protocol and IMS means Internet map server. A mobile services server 128 is supported by server 126 and facilitates enhanced capabilities for wireless mobile units in accordance with an embodiment of the present invention. For example, wireless mobile units may access and download an application program from server 128 that can be installed and operate on the wireless mobile unit to provide enhanced functionality and control of user data in accordance with an embodiment of the present invention. This will be described in greater detail below. Another end user communication device 130, which may comprise a computer or other device, is connected to the communication network 124 by other than a wireless communication link, e.g. a wire internet link through an IP service provider.

Figure 2:
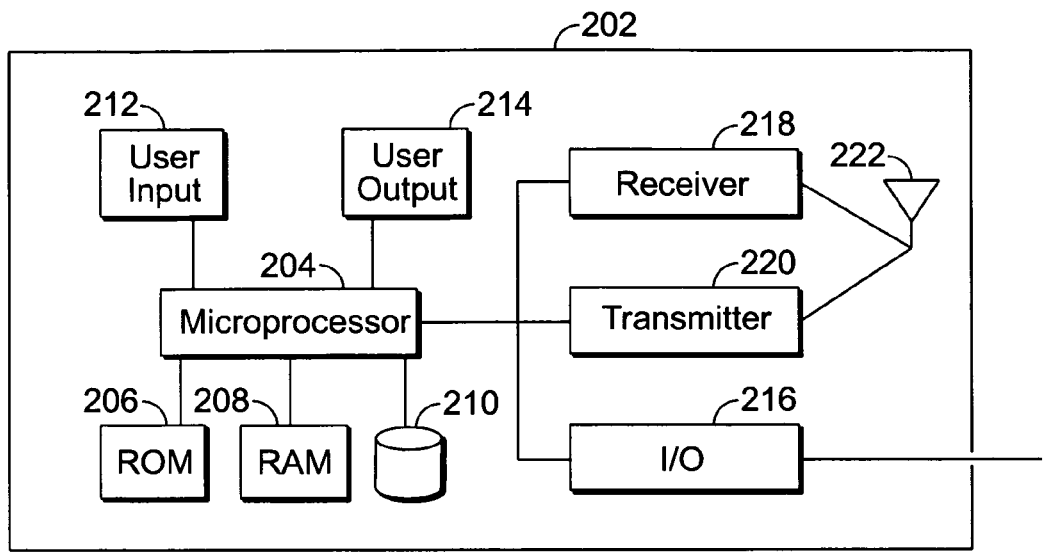
FIG. 2 is a block diagram of an exemplary device in accordance with the present invention.

FIG. 2 shows an exemplary block diagram of a device 202 which can represent mobile services server 128 or an end user wireless or wired device as explained below. A microprocessor 204 performs processes and tasks based on stored program instructions. It is supported by read-only memory (ROM) 206, random access memory (RAM) 208 and nonvolatile data storage device 210. As will be understood by those skilled in the art, data and stored program instructions in ROM 206 is typically utilized by microprocessor 204 to initialize and boot the computing apparatus. An application program, e.g. a program that controls the implementation of one or more functions performed by the device, is stored in storage element 210. At least active portions of the application program will be typically stored in RAM 208 for ready access and processing by microprocessor 204. The application program is specific to the functions to be performed by the device, and performs the functions and steps as described herein. A variety of user inputs 212 such as a keyboard, keypad, touchpad and/or mouse can be utilized to control the operation of the device and the application running on it. User outputs 214, e.g. a display monitor or screen, provide output for the user of the device. An input/output (I/O) module 216 provides a communication interface permitting microprocessor 204 to transmit and receive data with external nodes. The above described elements of device 202 are utilized in a wireless mobile unit, e.g. a cellular telephone, as well as in a server, e.g. mobile services server 128, and a wired connected end user device, e.g. a personal computer.

Where device 202 represents a wireless mobile unit, a radio frequency receiver 218, transmitter 220 and an antenna 222 are also present and used for wireless communications between the unit and supporting RANs. The I/O module 216 supports communications with supporting external peripherals, e.g. USB communications with a peripheral. When device 202 represents a wireless mobile unit, the application program controlling the microprocessor 204 is supported by an operating system and includes an enhanced services (ES) application program such as downloaded from server 128 and installed in the wireless unit. In this case, the user will be the person using the wireless mobile unit. The ES application program provides the wireless mobile unit with functions as explained below.

Where device 202 represents the mobile services server 128 (where elements 218, 220 and 222 are absent), the I/O module 216 supports communications with supporting external nodes, e.g. server 126 or other nodes. In this case, the application program controlling the microprocessor 204 is supported by an operating system and includes a services support (SS) application program which supports the downloading, upon a request from a wireless unit, the ES application program from server 128 to the requesting wireless mobile unit. In this case, the user will be an administrator who maintains the operation of the server. The SS application supports the registration of wireless mobile units, and may also support the storage of user data for use in backup and restore functions with the respective wireless mobile units.

Figure 3:
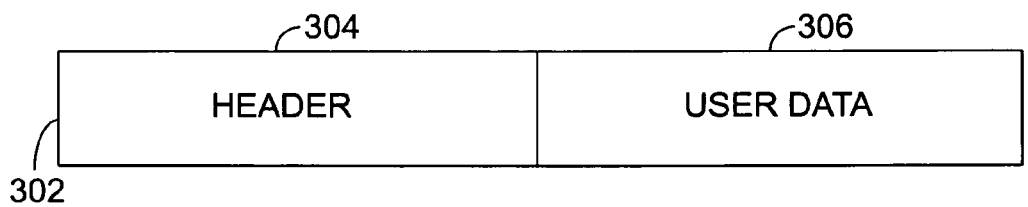
FIG. 3 illustrates a known packet structure for transmitting an SMS message.

FIG. 3 illustrates a known packet 302 used for transmitting SMS messages. Packet 302 includes a header 304 and a user data portion 306. The header 302 contains a number of fields in which data represents information and parameters that are used in the transmission, routing and processing of the packet. The header fields differ depending on whether the packet was originated from a mobile unit or is to be delivered to a mobile unit. Both types of packets include the following header information: the service center address (SCA), the protocol data unit type (PDU) that itself includes a variety of different fields, a protocol identifier (PID) that determines how the SMSC is to process the packet, the digital coding scheme (DCS) identifying the coding scheme within the user data, the user data length (UDL) that specifies the length of the user data. For packets to be delivered to a mobile, the header also contains: the originator address (OA), a service center time stamp (SCTS) identifying the time when the SMSC received the message. For packets originated from a mobile, the header also contains: a message reference (MR) that supplies a successive number that assists with reassembly of a user message that is sent using multiple packets due to its length, a destination address (DA), a validity period (VP) which identifies a time from where the message is no longer valid in the SMSC. The user data portion 306 contains a message of alphanumeric characters input by the user which is the information desired to be communication to another. As is known, the number of characters that can be contained within one user data portion 306 is limited in accordance with the data length limitation of 140 octets associated with signaling system seven (SS 7). Using 7 bit coding, 160 characters can be contained in one user data portion. However, if Unicode coding is utilized, user data portion will accommodate fewer characters as two bytes per character are used.

Figure 4:
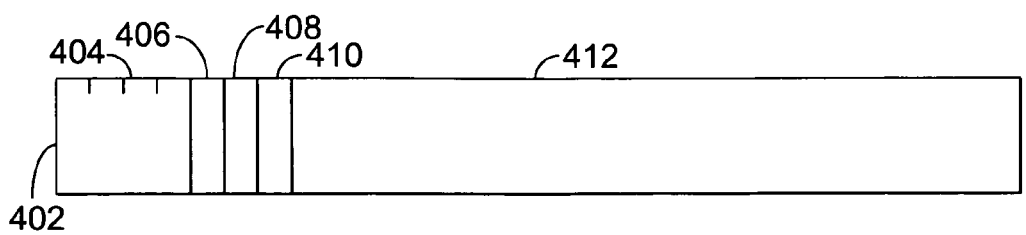
FIG. 4 illustrates a data segment having fields for containing information in accordance with an embodiment of the present invention.

FIG. 4 illustrates a data segment having a sequence of fields containing information in accordance with an embodiment of the present invention. The data segment 402 is coextensive with and resides within a user data segment 306. However, the data segment 402 contains command and control information in addition to a user input message. As will be explained in more detail below, a data segment 402 is processed by the services support application program operating on the originating and terminating wireless mobile unit wherein the command and control information is identified and processed based on predetermined command and control codes stored as part of the services support application program. Because the data segment 402 is totally encapsulated within the user data portion 306, e.g. a user data portion of an SMS message, the data segments 402 are simply treated as conventional user data by the telecommunication infrastructure nodes which pass the encapsulated data segments 402 from an originating wireless mobile unit to a terminating wireless mobile unit. Only the wireless mobile units process the data segments using the services support application program and implement actions corresponding to any command and control information contained within the data segment 402, as well as providing the user with any user message included in a user data segment.

In the exemplary embodiment, field 404 of the data segment 402 consists of four bytes which identify one of a plurality of message types in accordance with predetermined message types stored in the SS application program. In this example, field 404 contains the label "//P:" wherein the characters // and : form part of the label, and the "P" identifies a specific type of message, i.e. a Peanut message type. In this exemplary embodiment, a Peanut message type identifies the message as being a person-to-person communication. Different characters in place of the "P" in this field can be used to identify other message types where each message type is associated with different subject matter, e.g. email, banking, insurance, coupons, games, health care, etc. Field 406 consists of one byte identifying the format or coding structure. In this example, field 406 may have valid values of 0, 1 or 2 wherein 1 indicates a control message, 0 indicates a normal user message utilizing 7 bit coding, and 2 indicates a normal user message utilizing the Unicode format. Field 408 consists of one byte, i.e. a command byte, identifying the length of message parameter values and may have valid values of 0-128. The value of field 408 specifies the number of sequential following bytes that are part of a control portion of the data segment, i.e. bytes before the user input data begins. Field 410 consists of a number of bytes equal to the value in field 408, e.g. 0-128, and contains name value pairs as will explained in the below examples. Field 412 contains the user input information desired to be conveyed to another party. If the length of the user input information exceeds the number of bytes available in field 412 of one data segment, the user input information can be parsed and transmitted as multiple fragments sent in a series of SMS packets containing corresponding data segments 402 with the parsed user information.

FIG. 5 is a table where each row represents an example of bytes in different data segments 402. The top row of FIG. 5 contains labels of the first 19 bytes showing the respective byte positions 0-18. A first example, Ex1, shows an exemplary control message that will be interpreted by the ES application program operating on the destination wireless mobile unit to deactivate the ES application program on the subject mobile unit. The command may be sent from the SS application program running on the server as the result of termination of registration on the subject user or as a request of the owner of the subject mobile unit since the subject handset is currently lost or stolen. Deactivation of the ES application program will prevent the ES application program from operating on the subject mobile handset, which in turn prevents usage of features and/or user data only accessible through the ES application program. Bytes 0-3, which correspond to "//IP:", define the data segment 402 as being a Peanut application. The 1 value in byte 4 defines the data segment as being a control message, and the 0 value in byte 5 indicates that no length of message parameter values is specified. The character string "DEACTIVATE" residing in bytes 6-15 will be interpreted by the ES application program on the recipient mobile unit as a predefined command to prohibit further operation of the ES application program on the subject mobile unit.

Example 2 of FIG. 5 is a data segment similar to example 1 in that it contains a "WIPEOUT" command that will be interpreted by the ES application program on the recipient wireless mobile unit as a request to completely wipe out user data stored through the Peanut application operating under the ES application program. That is, all messages, contacts, templates and other user data stored by the Peanut application will be deleted. These first and second examples are intended to be merely representative of a variety of commands that can be utilized, e.g. "ACTIVATE" to activate a Peanut application, "CHANGEPIN <xxxx>" to permit the changing of a personal invitation number or password to the value xxxx contained in the control message, etc.

Example 3 of FIG. 5 illustrates a different type of Peanut application data segment in which the 0 value in byte 4 indicates that the data segment is a normal message type. The 0 value in byte 5 indicates that no message parameter values are specified. The Peanut application on the receiving wireless mobile unit will interpret this data segment as merely carrying a message, "HELLO FM MIKE", to be conveyed to the user.

Example 4 of FIG. 5 carries the same message to be conveyed to the user as in example 3. Again, the 0 value in byte 4 indicates that the data segment is a normal message type. However, the 4 value in byte 5 indicates that the next 4 bytes carry control information that precedes the user message. In this example, bytes 6-9 contain "E006", where the E in byte 6, i.e. a command identification character, indicates that an expiration of the subject message is to be executed (message is to be automatically deleted), 0 in byte 7 indicates expiration in zero days, 0 in byte 8 indicates expiration in zero hours, and the 6 in byte 9 indicates expiration in six minutes. That is, upon the receipt of this data segment by the Peanut application on the destination wireless mobile unit, the subject message, "HELLO FM MIKE", will be conveyed to the user, but all instances of this message will be automatically deleted from recipient mobile unit on the expiration of six minutes.

Example 5 shows an illustrative Peanut application data segment which is similar to example 4 in that the value in byte 5 is not zero indicating that a command in addition to the user messages contained in the data segment. In this example, the 7 in byte 5 indicates that the seven following bytes are associated with command information and precede the beginning of the user data to be conveyed. The L in byte 6 will be interpreted as signifying that the subject data segment is a long message, i.e. the subject user message has too many characters to be contained in only one data segment, thereby requiring fragmentation of the user message into a plurality of message fragments that will be transmitted in a number of data segments. The next four bytes, bytes 7-10, collectively comprise a value used to identify each of the required data segments needed to complete the long message. In this example, this value is "0001". The next byte, byte 11, represents the total number of data segments required to complete the long message. In this example, byte 11 has a value of 2 indicating that two data segments are required to complete the single long message. Byte 12 represents the current fragment number of the subject data segment. In this example, byte 12 has a value of 1 indicating that this is the first data segment fragment of the long message in the long message fragments identified as "0001". The first character of the actual user message is in byte 13 with the remaining bytes in the subject data segment carrying further portions of a first message fragment. Example 6 shows the second and last message fragment that completes the long message identified by "0001". Byte 12 of example 6 contains a value of 2 indicating that it is the second in a message fragment series. It is also the last of the message fragment series since byte 11 indicates that the long message is contained in two message fragments. Byte 13 in example 6 contains the first character of user data in this data segment, but corresponds to the next character in the long user message that follows the last character of the user message contained in the preceding data segment represented by example 5.

Example 7 illustrates a data segment that contains two commands. The value 12 in byte 5 indicates that the following 12 bytes are associated with commands. As explained in example 4, the values "E005" in bytes 6-9 indicate a message expiration upon five minutes from the receipt by the Peanut application. The value 255 in byte 10 serves as a predetermined separation character used to separate commands. Similar to example 6, the L in byte 11, which is the first field/character at the beginning of a command string, identifies this data segment as a long message. The bytes 12-15 serve to identify the fragments in series of data segments. Byte 16 has a value of 2 indicating that there are a total of two fragments in the long message series and byte 17 with a value of 1 indicates that this is the first fragment in the series. The first portion of the actual user message follows beginning at byte 18.

Example 8 represents the second fragment of the long message where the first fragment was described in example 7. It will be noted that this data segment contains only a single command associated with the long message fragmentation. That is, the time expiration contained as a first command in the first message fragment is not repeated. In accordance with an embodiment of the present invention, a time expiration command communicated in a first message fragment will automatically be effective for all succeeding fragments of the same long message. Thus, the entirety of the perceived long message will be subject to the time expiration. In this example, the value 7 in byte 5 indicates a following command string of seven characters in which: L in byte 6 identifies this segment as a long message type, "0002" in bytes 7-10 identifies the long message fragment series, 2 in byte 11 indicates that the long message consists of two message segments, and the 2 in byte 12 indicates that this is the second fragment in the series of the identified long message, and since there are only two message fragments in this long message, the 2 in byte 12 also indicates that this is the last received fragment in the series. The remaining portion of the user message begins with byte 13 and continues to the conclusion of the user message is contained in this message fragment.

In the above examples of FIG. 5, all of the characters in the various byte positions are shown in a clear text format. In order to preserve security during the transmission of such messages, it is preferred that the majority of each message be sent in an encrypted format. For example, all bytes after byte 3 will preferably be transmitted utilizing a form of encryption. Those skilled in the art will understand that the use of such encryption requires that the receiving wireless mobile device be capable of decrypting the received encrypted characters thus transforming each received message into a corresponding clear text format as illustrated in accordance with FIG. 5.

Figure 6:
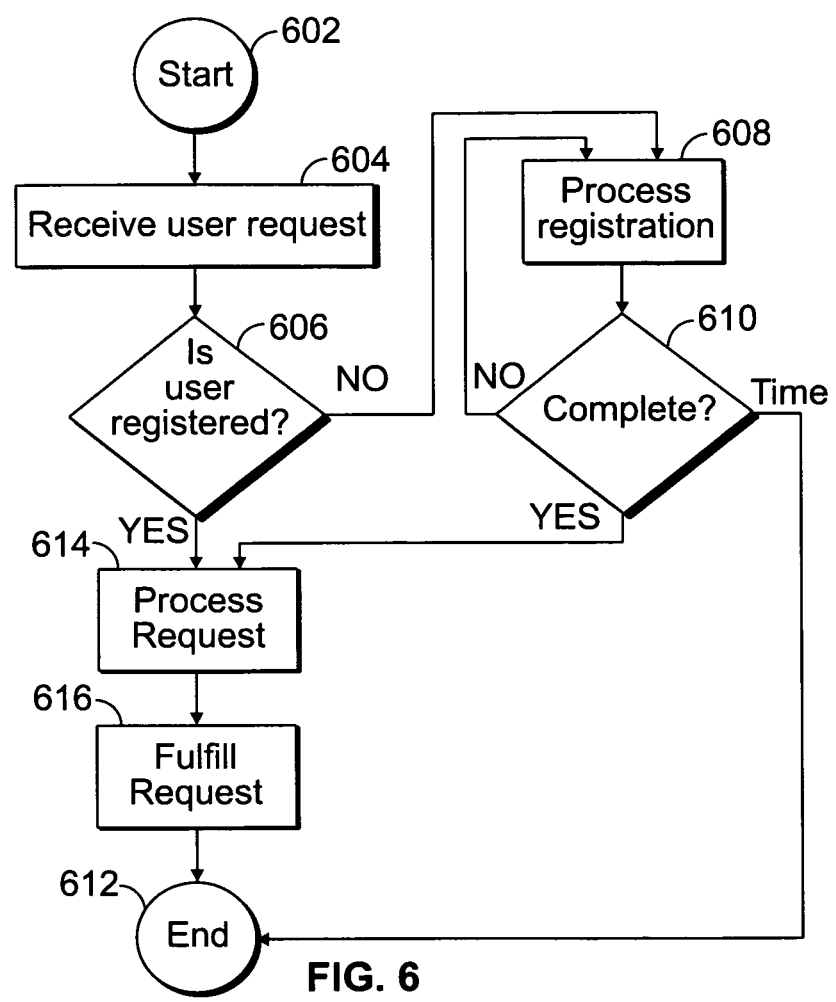
FIG. 6 is a flow diagram illustrating the operation of the mobile services server in accordance with an embodiment of the present invention.

FIG. 6 is an illustrative flow diagram of the operation of the mobile services server in accordance with an embodiment of the present invention. The illustrated process begins with START 602. In step 604 the server receives a user request in the form of a message such as including a command in the format as illustrated in FIG. 5. Upon receiving the user request, a determination is made in step 606 of whether the user is registered. This step may include the services server querying a database storing a list of registered users to determine if the requesting user is registered. A NO determination by step 606, indicating that the requesting user is not registered, results in step 608 beginning a registration process of the subject user. The process may include the transmission of messages between the server and the user's wireless mobile unit by which the server ascertains sufficient information to register the user. In step 610 a determination is made of whether the registration process is complete. A NO determination by step 610 results in further processing by step 608. Should the registration process not be completed within a predetermined time period, step 610 will time out resulting in the termination of the process and the request has indicated at END 612.

A YES determination by step 606 or a YES determination by step 610 results in the user request being processed as indicated by step 614. Processing of the request may include parsing the received request to determine included commands and/or user message components. Such processing is substantially the same as described later with regard to processing of received messages by wireless mobile unit. In step 616, the request is fulfilled. The fulfilling or action taken in response to the request will vary depending upon the nature of the request itself. The action taken may be applicable to the wireless mobile unit that originated the request or to a different wireless mobile unit. For example, a BACKUP request will cause the uploading and storage of user data contained on the requesting mobile unit to the services server. A RESTORE request will cause the stored user data previously obtained during a BACKUP request to be downloaded and installed on the requesting local unit from the services server. However, other commands may initiate actions to be taken at a wireless mobile unit that is not the requesting mobile unit. For example, a DEACTIVATE request received by the services server from a first mobile unit will cause another wireless mobile unit, having an address specified in the request, to be deactivated. Such a request requires user authentication to ensure that the user making the request is the registered owner of the device to which the deactivation request is directed. The process terminates at END 612.

Figure 7:
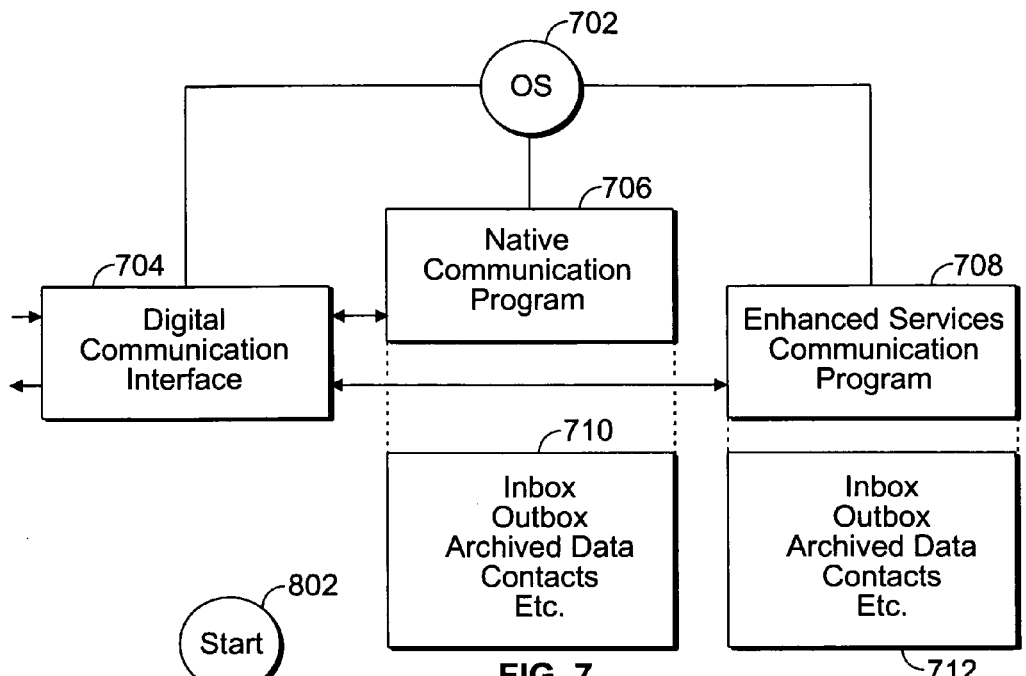
FIG. 7 is a representation of the relationship of application programs operating on a wireless mobile unit that provides enhanced services in accordance with an embodiment of the present invention.

FIG. 7 shows the relationship of programs operating on a wireless mobile unit that provides enhanced services in accordance with an embodiment of the present invention. This shows an overview of the general relationship between the operating system (OS) 702, the digital communication interface 704, a native communication program 706 and the enhanced services communication program 708. As known to those skilled in the art, a number of different operating systems support the operation of various programs and applications on different wireless mobile units, e.g. Symbian, Android, Apple's iOS, Research In Motion's BlackBerry OS, Microsoft's Windows Phone, etc. The digital communication interface 704 converts the information provided from the wireless receiver into a digital character string for processing by the native communication program 706 or the enhanced services communication program 708. The digital communication interface 704 also converts a digital character string received from program 706 or 708 into information provided to the wireless transmitter.

Native communication program 706 supports a plurality of files and/or records 710, e.g. inbox, outbox, archived data, contacts, etc. The native communication program refers to the communication program originally supplied by the manufacturer or service provider upon the initial acquisition of a wireless mobile unit by a user. The enhanced services communication program 708 is an application program that is typically installed by the user such as by downloading it from the services server or otherwise installing it from an external source. The enhanced services communication program 708 also supports a plurality of files and/or records 712, e.g. inbox, outbox, archived data, contacts, etc. In accordance with an embodiment of the present invention, the user must obtain access to the enhanced services communication program in order to access its supported files and records. Access may be, for example, obtained by entering a user identification and corresponding password in response to user prompts displayed on the screen by the enhanced services communication program upon request to open this program. Interactions between the enhanced services communication program and the native communication program is supported by an application program interface (API) associated with the native communication program and/or supported by the operating system itself.

In the illustrated example, the digital communication interface 704 transmits and receives digital communication strings with both the native communication program 706 and the enhanced services communication program 708. Since communications originated from a wireless mobile unit utilizing the enhanced services communication program is encrypted, the receipt of such an encrypted communication by a destination mobile device will be unintelligible as viewed from a native communication program of the destination mobile device. However, the message may be viewed in clear text format by utilizing the enhanced services communication program on the destination mobile device. For example, a received SMS text message that was transmitted from an enhanced services communication program on the origination mobile device, will appear as a string of unintelligible characters when viewed by the native communication program of a recipient device, except for the leading format indicator "//P:". The same message will be displayed in a clear text format in the inbox of enhanced services communication program on the recipient device.

Figure 8:
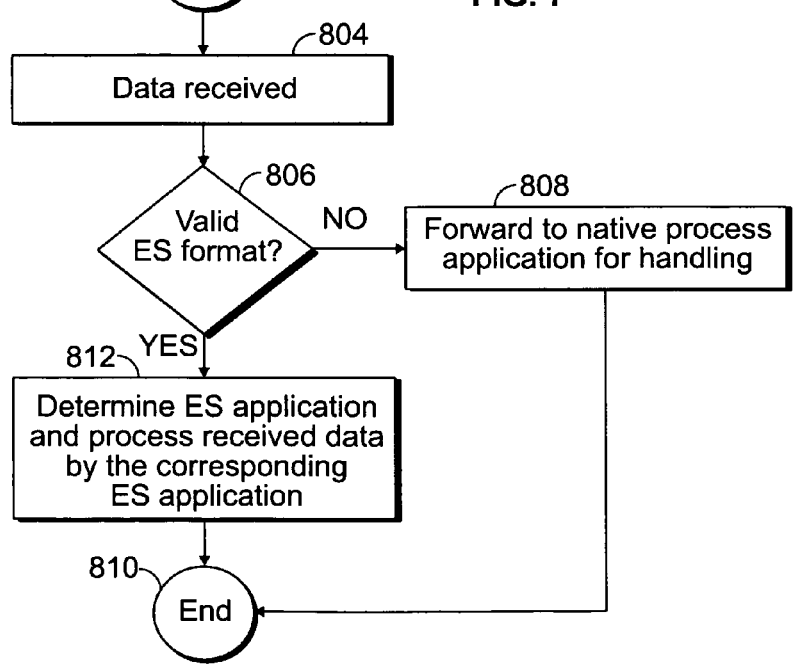
FIG. 8 is a flow diagram of a method practiced by a wireless mobile unit that provides enhanced services in accordance with an embodiment of the present invention.

FIG. 8 shows steps of a method practiced by a wireless mobile unit that provides enhanced services in accordance with an embodiment of the present invention. This process begins at START 802. In step 804 incoming data originated from another wireless mobile unit is received at the subject destination wireless mobile unit. A determination is made at step 806 of whether the incoming data uses enhanced services formatting. A NO determination by step 806 results in step 808 causing the incoming data to be routed to native communication application program for handling. For example, if the first 4 bytes in the received data communication is not "//P:", the communication is forwarded to the native communication application program. All in processing by step 808, process terminates at END 810. A YES determination by step 806, indicating that an enhanced service format is present, results in processing by step 812 wherein the determination is made of the type of enhanced service application that is present in the received data is transferred to the corresponding enhanced service application. For example, receipt of the communication with "//P:" will be routed to the Peanut enhanced services program while the receipt of the communication with "//X:" (where X is a character other than 'P') will be routed to the corresponding enhanced services program associated with X. The processing concludes that END 810.

Figure 9:
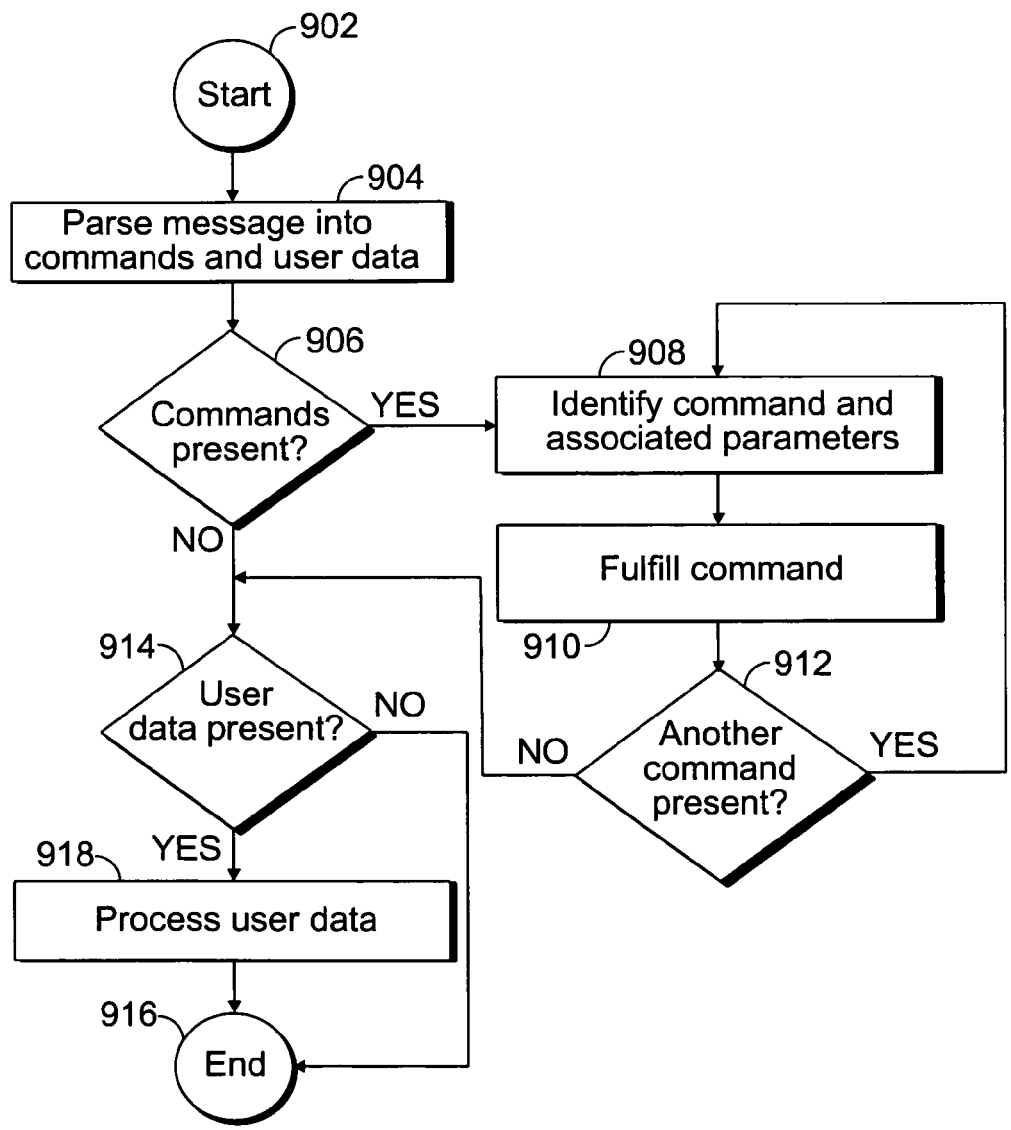
FIG. 9 is a flow diagram of steps utilized by a wireless mobile unit to process a received message in accordance with an embodiment of the present invention.

FIG. 9 shows a flow diagram of steps utilized by a wireless mobile unit to process a received enhanced services message in accordance with an embodiment of the present invention. Beginning with START 902, the received message is parsed into commands and user data in step 904. As explained with regard to FIG. 5, the values contained in bytes 4 and 5 can be used to separate the received message into commands and user data. The message may consist of only commands, only user data, or commands and user data. In step 906 a determination is made of whether commands are present. A YES determination by step 906 results in step 908 identifying a first command and its associated parameters. The type of command is identified by comparing the received command characters with a table of predetermined commands stored in the wireless mobile unit as part of the enhanced services application program. This table also contains a stored list of predetermined parameters associated with the command, where the value of receipt parameters determines the extent or range of an associated action associated with the command. In step 910 the identified command is fulfilled, i.e. depending on the type of command, the command may be immediately executed or scheduled to be executed upon the occurrence of an event or scheduled for execution at a later time. In step 912 a determination is made of whether another command is present in the received message. A YES determination by step 912 results of processing continuing with step 908.

A NO determination by step 906 or a NO determination by step 912 results in step 914 making a determination of whether user data is present in the subject received message. A NO determination by step 914, indicating that no user data is present to be processed, results in the conclusion of processing at END 916. A YES determination by step 914 results in step 918 processing the user data contained in the received message. Typically, in the case of an SMS text message, processing user data includes providing an alert to the user indicating that a message has been received, displaying the received message on the screen of the user's wireless mobile unit, and storing the received message as a file or record, e.g. a record in the INBOX of the enhanced services application program. Assuming the message was transmitted as an encrypted format, the message will be decrypted, displayed on the screen, and stored in the INBOX as a clear text message by the enhanced services application program. The processing that concludes at END 916.

Figure 10:
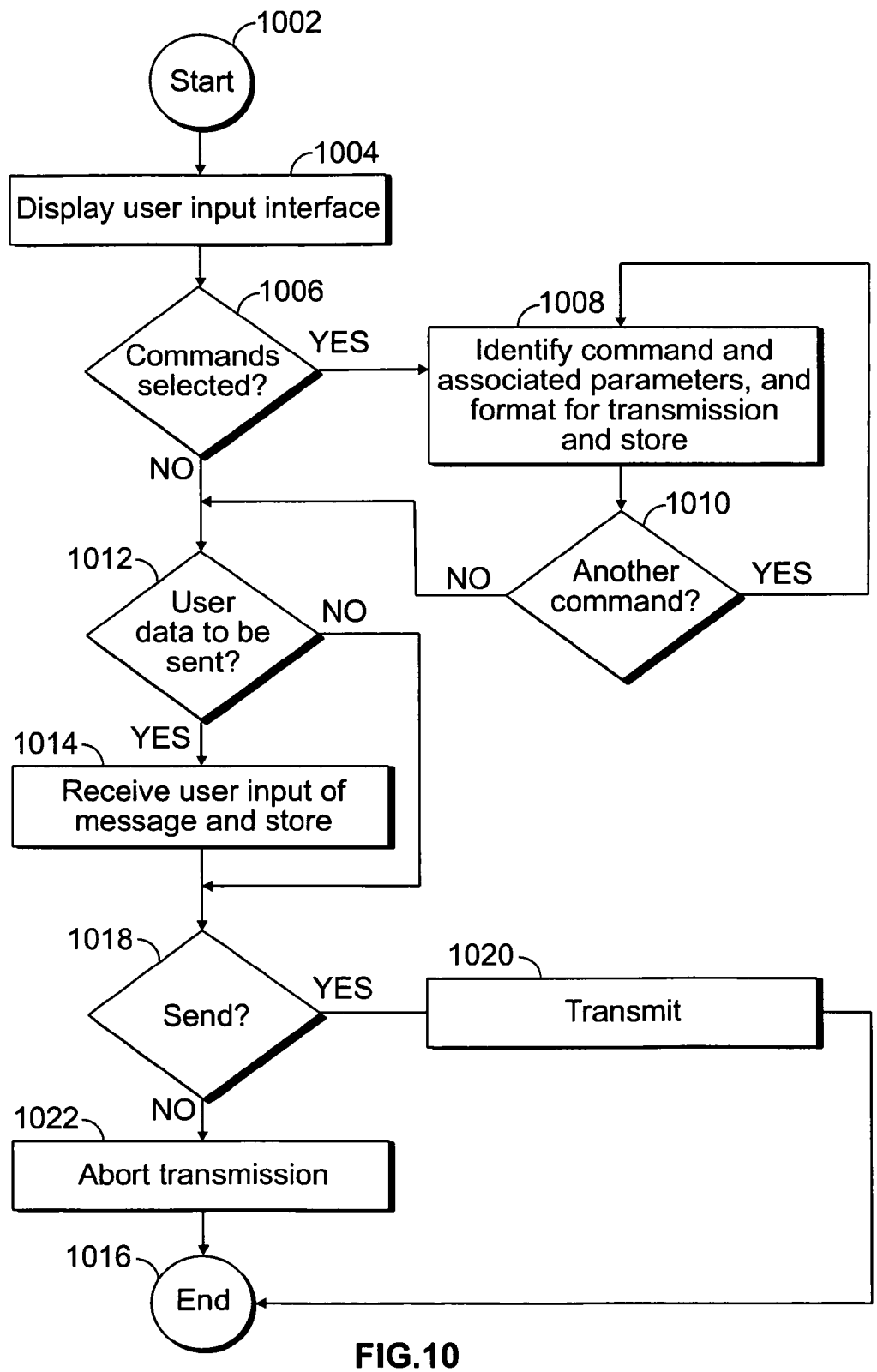
FIG. 10 is a flow diagram of steps utilized by wireless mobile unit associated with the transmission of a message in accordance with an embodiment of the present invention.

FIG. 10 shows a flow diagram of steps utilized by wireless mobile unit associated with the transmission of a message by the enhanced services application program in accordance with an embodiment of the present invention. Beginning with START 1002, a user input interface is displayed on the screen of the user's wireless mobile unit at step 1004. This input interface may consist of graphical user interface with one or more menus each containing a list of items or commands for selection by the user. Alternatively the user may be presented with a blank field in which alphanumeric characters can be entered by the user. Part of the input interface may include the selection of an existing contact or entry of the address of the wireless mobile unit to receive the message being composed. In step 1006 determination is made of whether commands have been selected by the user to be included in the message to be transmitted to another user. A YES determination by step 1006 results in step 1008 identifying the command and its associated parameters to be included in the message, and storing the command in an appropriate format for later transmission. As part of the enhanced services application program, each of the user selectable commands as provided by user input interface is linked to a corresponding command by a table or records stored in the wireless mobile unit as part of the enhanced services application program. As explained with regard to FIG. 5, a first command and its parameters are formatted to occupy a series of bytes beginning with byte 6. In step 1010 determination is made of whether another command is selected by the user to be included in the same message. A YES determination by step 1010 results in step 1008 processing further selected command. Example 7 in FIG. 5 illustrates a second command included in the same message. Formatting of further commands includes inserting a separation character "255" at the byte following a previous command followed by the insertion of the command characters and its parameters. After the insertion of all commands to be transmitted in a single message, the values in byte positions 4 and 5 are determined and inserted as previously explained with regard to FIG. 5.

A NO determination by step 1010 or by step 1006 results in step 1012 making a further determination of whether user data is to be sent as part of the message being composed by the user. A YES determination by step 1012, indicating that user data is to be included, results in step 1014 receiving the user input of the data to be included in the message and storing the user data beginning at the byte position following the last byte of the last command. User input data can be input utilizing a graphical user interface such as from menu selection or by accepting alphanumeric characters entered the user in a predetermined data entry field. Following step 1014 or upon a NO determination by step 1012, indicating that no user data is to be included, a determination is made in step 1018 of whether the completed message should be sent. A YES determination by step 1018 results in the composed message being transmitted to the destination wireless mobile unit by step 1020. As part of the transmission process, the transmitted message may be stored in the OUTBOX of the originating wireless mobile unit. The process concludes at END 1060. A NO determination by step 1018, indicating that the composed message is not to be transmitted, results in the aborting of the transmission of the message at step 1022 and determination of processing at END 1016.

The wireless mobile unit in one example employs one or more computer-readable signal-bearing tangible media. The computer-readable signal-bearing tangible media store software, firmware and/or assembly language for performing one or more portions of one or more embodiments of the invention. The computer-readable signal-bearing tangible medium may contain stored data in the form of magnetic, electrical, optical, biological, and atomic information. For example, the computer-readable signal-bearing tangible medium comprise floppy disks, magnetic tapes, CD-ROMs, DVD-ROMs, hard disk drives, and electronic memory.

Although exemplary implementations of the invention have been depicted and described in detail herein, it will be apparent to those skilled in the art that various modifications, additions, substitutions, and the like can be made without departing from the spirit of the invention. For example, the above described command structure is applicable to alphanumeric character based communications, e.g. networking protocols SMTP, HTTP, IMS applications, email, etc., in addition to SMS text messages. The transmission medium is not limited to radio frequency wireless communications, and could include wire or cable communications as well as wireless infrared, optical fiber, etc.

The scope of the invention is defined in the following claims.

We claim:

1. A method for generating an electronic communication for transmission by a first end-user communication device to a second end-user communication device, the electronic communication being a digital packet having a header segment and a body segment in accordance with a standardized communication protocol, the method comprising:

encapsulating within the body segment a user data segment by an enhanced services application program stored in memory of the first end-user communication device where every byte of the user data segment is treated by the standardized communication protocol as carrying a user entered message of the first end-user communication device for delivery to the second end-user communication device, the enhanced services application program separating the user data segment to have three portions, a first portion containing a first label, the second portion following the first portion and containing command data, and the third portion following the second portion and containing a message entered by the user of the first end-user communication device to be conveyed to the user of the second end-user communication device;

accepting input from the user of the first end-user communication device via a graphical user interface where the input identifies an action to be taken;

translating the input by the enhanced services application program into corresponding command data where the command data itself is not displayed to the user of the first end-user communication device;

the first label corresponds to one of predetermined labels stored in memory of the first end-user communication device, the label being a single character or a single group of consecutive characters where the label always precedes all other information contained in the user data segment, the first label itself as interpreted by the enhanced services application program not being displayed to the respective users;

routing of the digital packet from the first end-user communication device controlled by the header which includes all information in the digital packet that precedes the body segment, the digital packet not containing any information outside of the user data segment that identifies an internal data structure for information contained in the user data segment;

the first label being the only parameter in the digital packet generated by the first end-user communication device that determines whether information contained in the user data segment is to be routed to a native program stored in memory of the second end-user communication device or to an enhanced services application program stored in memory of the second end-user communication device;

transmitting the digital packet by the first end-user communication device for delivery to the second end-user communication device;

said second portion of the user data segment containing a series of bytes including a command byte occupying a predetermined location in the series of bytes, the command byte containing a numeric value that represents a number of bytes following the command byte that contain information associated with commands;

the second portion of the user data segment contains a second command separate from a first command, said command byte containing a numeric value that represents the number of bytes following the command byte that contain information associated with the first and second commands, a separation character occupying a byte following a last byte associated with the first command and preceding a first byte associated with the second command.

2. The method of claim 1 wherein the standardized communication protocol used to transport the electronic communication comprises short messaging service (SMS) protocol that conveys the user data segment as an SMS text message, the first label contained in the user data segment identifies a corresponding first enhanced services application program that controls the processing of the SMS text message.

3. The method of claim 1 wherein all of said digital packet being treated by the standardized communication protocol as carrying a user entered message, processing the user data segment as conventional user data by telecommunication infrastructure nodes involved in passing the packet to the second end-user communication device.

4. The method of claim 1 wherein said digital packet is conveyed by one of short messaging service (SMS), simple mall transfer protocol (SMTP), hypertext transfer protocol (HTTP) and multimedia messaging service (MMS).

5. A method for generating an electronic communication for transmission by a first end-user communication device to a second end-user communication device, the electronic communication being a digital packet having a header segment and a body segment in accordance with a standardized communication protocol, the method comprising:

encapsulating within the body segment a user data segment by an enhanced services application program stored in memory of the first end-user communication device where every byte of the user data segment is treated by the standardized communication protocol as carrying a user entered message of the first end-user communication device for delivery to the second end-user communication device, the enhanced services application program separating the user data segment to have three portions, a first portion containing a first label, the second portion following the first portion and containing command data, and the third portion following the second portion and containing a message entered by the user of the first end-user communication device to be conveyed to the user of the second end-user communication device;

accepting input from the user of the first end-user communication device via a graphical user interface where the input identifies an action to be taken;

translating the input by the enhanced services application program into corresponding command data where the command data itself is not displayed to the respective users by the first and second end-user communication devices;

the first label corresponds to one of predetermined labels stored in memory of the first and second end-user communication devices, the label being a single character or a single group of consecutive characters where the label always precedes all other information contained in the user data segment, the first label itself as interpreted by the enhanced services application program not being displayed to the respective users by the first and second end-user communication devices;

routing of the digital packet from the first end-user communication device controlled by the header which includes all information in the digital packet that precedes the body segment, the digital packet not containing any information outside of the user data segment that identifies an internal data structure for information contained in the user data segment;

the first label being the only parameter in the digital packet generated by the first end-user communication device that determines whether information contained in the user data segment is routed to a native program stored in memory of the second end-user communication device or to an enhanced services application program stored in memory of the second end-user communication device;

transmitting the digital packet by the first end-user communication device for delivery to the second end-user communication device;

the third portion of the user data segment including a user text message intended to be displayed on the second end-user communication device, all of the information contained in the user data segment except for the first label contained in the first portion is encrypted which requires decryption that is unique to both the first enhanced services application program identified by the label and to the second end-user communication device so that a first enhanced services application program on another end-user communication device will not be capable of parsing or understanding the content of the second and third portions of the user data segment.

6. A computer usable non-transitory tangible medium stores a computer readable program code therein, said computer readable program code adapted to be executed to implement a method for generating an electronic communication for transmission by a first end-user communication device to a second end-user communication device, the electronic communication being a digital packet having a header segment and a body segment in accordance with a standardized communication protocol, the method comprising:

encapsulating within the body segment a user data segment by an enhanced services application program stored in memory of the first end-user communication device where every byte of the user data segment is treated by the standardized communication protocol as carrying a user entered message of the first end-user communication device that is delivered to the second end-user communication device, the enhanced services application program separating the user data segment to have three portions, a first portion containing a first label, the second portion following the first portion and containing command data, and the third portion following the second portion and containing a message entered by the user of the first end-user communication device to be conveyed to the user of the second end-user communication device;

accepting input by the user of the first end-user communication device via a graphical user interface where the input identifies an action to be taken;

translating the input by the enhanced services application program into corresponding command data where the command data itself is not displayed to the user of the first end-user communication device;

the first label corresponds to one of predetermined labels stored in memory of the first end-user communication device, the label being a single character or a single group of consecutive characters where the label a ways precedes all other information contained in the user data segment, the first label itself as interpreted by the enhanced services application program not being displayed to the respective users;

routing of the digital packet from the first end-user communication device controlled by the header which includes all information in the digital packet that precedes the body segment, the digital packet not containing any information outside of the user data segment that identifies an internal data structure for information contained in the user data segment;

the first label being the only parameter in the digital packet generated by the first end-user communication device that determines whether information contained in the user data segment is to be routed to a native program stored in memory of the second end-user communication device or to an enhanced services application program stored in memory of the second end-user communication device;

transmitting the digital packet by the first end-user communication device for delivery to the second end-user communication device;

said second portion of the user data segment contains a series of bytes including a command byte occupying a predetermined location in the series of bytes, the command byte containing a numeric value that re presents a number of bytes following the command byte that contain information associated with commands;

the second portion of the user data segment contains a second command separate from the first command, said command byte containing a numeric value that re presents the number of bytes following the command byte that contain information associated with the first and second commands, a separation character occupying a byte following a last byte associated with the first command and preceding a first byte associated with the second command.

7. The computer usable non-transitory tangible medium of claim 6 wherein the standardized communication protocol used to transport the electronic communication comprises short messaging service (SMS) protocol that conveys the user data segment as an SMS text message, the first label contained in the user data segment identifies a corresponding first enhanced services application program that controls the processing of the SMS text message.

8. A computer usable non-transitory tangible medium stores a computer readable program code therein, said computer readable program code adapted to be executed to implement a method for generating an electronic communication for transmission by a first end-user communication device to a second end-user communication device, the electronic communication being a digital packet having a header segment and a body segment in accordance with a standardized communication protocol, the method comprising:

encapsulating within the body segment a user data segment by an enhanced services application program stored in memory of the first end-user communication device where every byte of the user data segment is treated by the standardized communication protocol as carrying a user entered message of the first end-user communication device that is delivered to the second end-user communication device, the enhanced services application program separating the user data segment to have three portions, a first portion containing a first label, the second portion following the first portion and containing command data, and the third portion following the second portion and containing a message entered by the user of the first end-user communication device to be conveyed to the user of the second end-user communication device;

accepting input by the user of the first end-user communication device via a graphical user interface where the input identifies an action to be taken;

translating the input by the enhanced services application program into corresponding command data where the command data itself is not displayed to the user of the first end-user communication device;

the first label corresponds to one of predetermined labels stored in memory of the first end-user communication device, the label being a single character or a single group of consecutive characters where the label always precedes all other information contained in the user data segment, the first label itself as interpreted by the enhanced services application program not being displayed to the respective users;

routing of the digital packet from the first end-user communication device controlled by the header which includes all information in the digital packet that precedes the body segment, the digital packet not containing any information outside of the user data segment that identifies an internal data structure for information contained in the user data segment;

the first label being the only parameter in the digital packet generated by the first end-user communication device that determines whether information contained in the user data segment is to be routed to a native program stored in memory of the second end-user communication device or to an enhanced services application program stored in memory of the second end-user communication device;

transmitting the digital packet by the first end-user communication device for delivery to the second end-user communication device;

the third portion of the user data segment includes a user text message intended to be displayed on the second end-user communication device, all of the information contained in the user data segment except for the first label contained in the first portion is encrypted which requires decryption that is unique to both the first enhanced services application program identified by the label and to the second end-user communication device so that a first enhanced services application program on another end-user communication device will not be capable of parsing or understanding the content of the second and third portions of the user data segment.

9. A first end-user wireless communication device that generates an electronic communication for transmission to a second end-user wireless communication device, the electronic communication being a digital packet having a header segment and a body segment in accordance with a standardized communication protocol, the first end-user wireless communication device comprising:

a microprocessor controlled apparatus encapsulates the user data segment within the body segment by an enhanced services application program stored in memory of the first end-user wireless communication device where every byte of the user data segment is treated by the standardized communication protocol as carrying a user entered message of the first end-user wireless communication device for delivery to the second end-user communication device, the enhanced services application program separating the user data segment to have three portions, a first portion containing a first label, a second portion following the first portion and containing command data, and a third portion following the second portion and containing a message entered by the user of the first end-user communication device to be conveyed to the user of the second end-user communication device;

a graphical user interface operating under the control of the microprocessor controlled apparatus accepting input by the user of the first end-user communication device where the input identifies an action to be taken;

the microprocessor controlled apparatus as controlled by the enhanced services application program translating the input by into corresponding command data where the command data itself is not displayed to the respective user of the first end-user communication device;

the first label corresponds to one of predetermined labels stored in memory associated with the microprocessor controlled apparatus; the first label being the only parameter in the digital packet generated by the first end-user communication device that determines whether information contained in the user data segment is to be routed to a native program stored in memory of the second end-user communication device or to an enhanced services application program stored in memory of the second end-user communication device, the label being a single character or a single group of consecutive characters where the label always precedes all other information contained in the message payload, the first label itself as interpreted by the enhanced services application program not being displayed to the user of the first end-user communication device;

the microprocessor controlled apparatus causing the transmission of the digital packet by the first end-user communication device for delivery to the second end-user wireless communication device based on the address contained in the header which includes all information in the digital packet that precedes the body segment, the header of the standardized communication protocol conveying no information associated with the configuration or structure of information contained in the user data segment;

said second portion of the user data segment containing a series of bytes including a command byte occupying a predetermined location in the series of bytes, the command byte containing a numeric value that represents a number of bytes following the command byte that contain information associated with commands;

the second portion of the user data segment containing a second command separate from a first command, said command byte containing a numeric value that represents the number of bytes following the command byte that contain information associated with a first and second command, a separation character occupying a byte following a last byte associated with the first command and preceding a first byte associated with the second command.

10. The method of claim 1 wherein a next byte following the command byte contains a command identification character, the command identification character corresponding to one of a predetermined set of command identification characters stored in memory of the first end-user communication device, each of the command identification characters in said predetermined set of command identification characters corresponding to a predetermined action to be taken by the second end-user communication device.

11. The first end-user wireless communication device of claim 9 wherein the electronic communication is conveyed by one of a short messaging service (SMS), simple mail transfer protocol (SMTP), hypertext transfer protocol (HTTP) and multimedia messaging service (MMS), said user data segment carrying only characters that are under the control of the user of the first wire less end-user communication device, the microprocessor controlled apparatus operating under control of the first enhanced services application program controlling the processing of the user data segment of said electronic communication.

12. The first end-user wireless communication device of claim 9 wherein the standardized communication protocol used to transport the electronic communication comprises short messaging service (SMS) protocol that conveys the user data segment as an SMS text message, the first label contained in the user data segment identifies a corresponding first enhanced services application program that controls the processing of the SMS text message.

13. The first end-user wireless communication device of claim 9 wherein a next byte following the command byte contains a command identification character, the command identification character corresponding to one of a predetermined set of command identification characters stored in said memory, each of the command identification characters in said predetermined set of command identification characters corresponding to a predetermined action to be taken by the microprocessor controlled apparatus.

14. A first end-user wireless communication device that generates an electronic communication for transmission to a second end-user wireless communication device, the electronic communication being a digital packet having a header segment and a body segment in accordance with a standardized communication protocol, the first end-user wireless communication device comprising:

a microprocessor control led apparatus encapsulates the user data segment within the body segment by an enhanced services application program stored in memory of the first end-user wireless communication device where every byte of the user data segment is treated by the standardized communication protocol as carrying a user entered message of the first end-user wireless communication device for delivery to the second end-user communication device, the enhanced services application program separating the user data segment to have three portions, a first portion containing a first label, a second portion following the first portion and containing command data, and a third portion following the second portion and containing a message entered by the user of the first end-user communication device to be conveyed to the user of the second end-user communication device;

a graphical user interface operating under the control of the microprocessor controlled apparatus accepting input by the user of the first end-user communication device where the input identifies an action to be taken;

the microprocessor controlled apparatus as controlled by the enhanced services application program translating the input by into corresponding command data where the command data itself is not displayed to the respective user of the first end-user communication device;

the first label corresponds to one of predetermined labels stored in memory associated with the microprocessor controlled apparatus; the first label being the only parameter in the digital packet generated by the first end-user communication device that determines whether information contained in the user data segment is to be routed to a native program stored in memory of the second end-user communication device or to an enhanced services application program stored in memory of the second end-user communication device, the label being a single character or a single group of consecutive characters where the label always precedes all other information contained in the message payload, the first label itself as interpreted by the enhanced services application program not being displayed to the user of the first end-user communication device;

the microprocessor controlled apparatus causing the transmission of the digital packet by the first end-user communication device for delivery to the second end-user wireless communication device based on the address contained in the header which includes all information in the digital packet that precedes the body segment, the header of the standardized communication protocol conveying no information associated with the configuration or structure of information contained in the user data segment;

the third portion of the user data segment includes a user text message intended to be displayed on the second end-user communication device, all of the information contained in the user data segment except for the first label contained in the first portion is encrypted which requires decryption that is unique to both the first enhanced services application program identified by the label and to the second end-user communication device so that a first enhanced services application program on another end-user communication device will not be capable of parsing or understanding the content of the second and third portion of the user data segment.

15. The method of claim 1 wherein only the information contained in the second portion of the user data segment of a digital packet received from the first end-user communication device is data that represents command instructions for the enhanced services application program on the second end-user communication device.

16. The method of claim 15 wherein the only information evaluated In the third portion of the user data segment of the digital packet is a text message entered by the user of the first end-user communication device to be conveyed to the user of the second end-user communication device.

17. The computer usable non-transitory tangible medium of claim 6 where all of said digital packet is treated by the standardized communication protocol as carrying a user entered message, processing the user data segment as conventional user data by telecommunication infrastructure nodes involved in passing the packet to the second end-user communication device.

18. The first end-user wireless communication device of claim 9 where all of said digital packet is treated by the standardized communication protocol as carrying a user entered message, processing the user data segment as conventional user data by telecommunication infrastructure nodes involved in passing the packet to the second end-user communication device.

* * * * *